June 26, 1951 J. A. HERBST 2,557,964
ERROR DETECTOR FOR TELEGRAPH PRINTERS
Filed Aug. 17, 1946
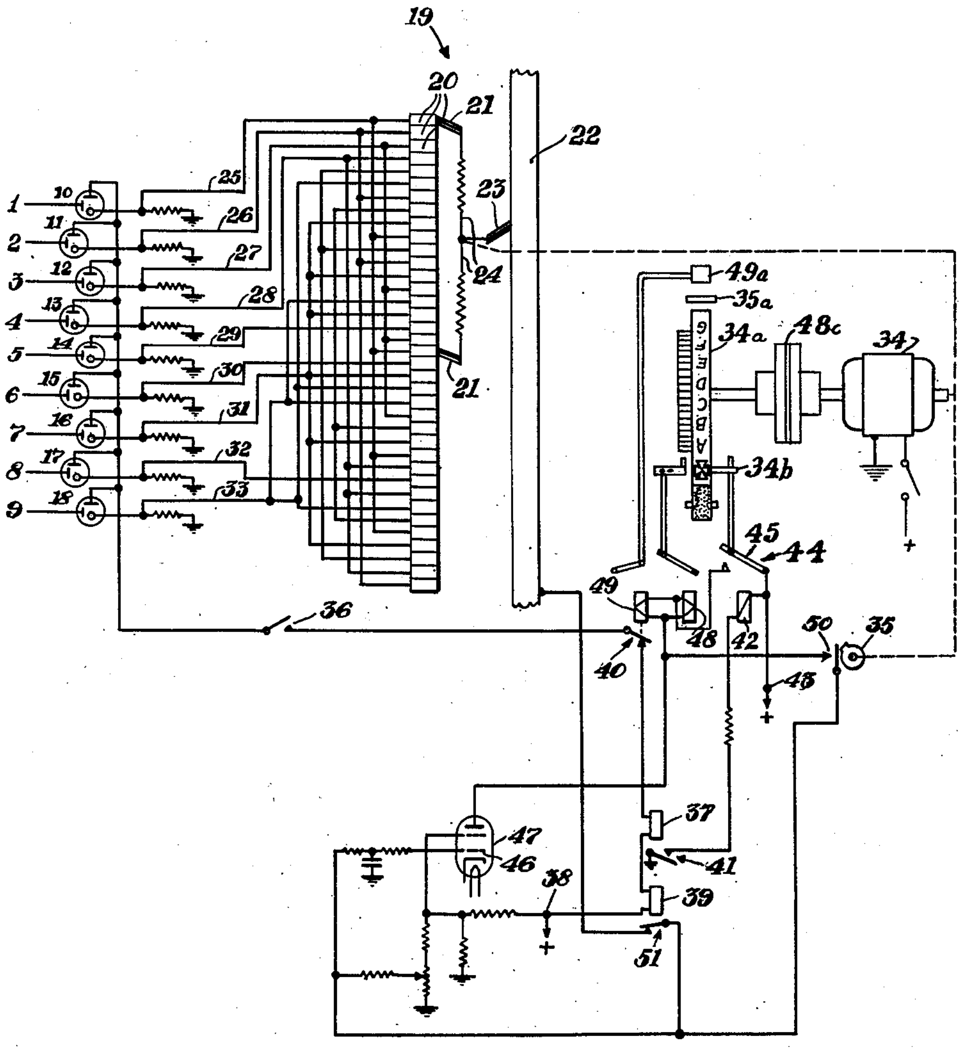
INVENTOR.
JOHN A. HERBST
BY
R P Morris
ATTORNEY Patented June 26, 1951

2,557,964

UNITED STATES PATENT OFFICE 2,557,964

ERROR DETECTOR FOR TELEGRAPH PRINTERS

John A. Herbst, Pines Lake, N. J., assignor to Federal Telephone and Radio Corporation, New York, N. Y., a corporation of Delaware Application August 17, 1946, Serial No. 691,281

2 Claims. (Cl. 178—23)

This invention relates to printer telegraph systems and, more particularly, to distributor arrangements associated with printing equipment of such systems and to methods and means for detecting and indicating errors in received telegraph signals.

Communication by means of printer telegraph apparatus has proven especially advantageous not only because of the permanent visual record of messages which is obtained, but additionally, in that protection is afforded against errors by interference and that a degree of secrecy is achieved by the signal codes utilized. A typical printer telegraph system might employ a fixed number of marking and spacing elements, for example, a nine-element code with two of the nine signal elements used for marking and the other seven elements used for spacing in each character. Since errors or interference generally either causes additional marking elements to occur at the receiver section of the telegraph systems or prevents signals of certain marking elements from appearing at this receiver section, it is desirable to provide an automatic error-indication when only one or more than two of the marking signal elements are received. It is also desirable of any printer telegraph arrangement that means be included for printing the transmitted message both at the transmitting and receiving positions; in the instance of an arrangement which makes use of the plural element code system, this involves complex electro-mechanical distributor equipment for permitting printing of certain characters in response to reception of definite signal combinations.

One of the objects of the present invention is to provide a printer telegraph system, of the type utilizing a plural-element code, wherein an improved electro-mechanical distributor arrangement is employed to deliver signals to the printer circuit.

A second object is to provide an electro-mechanical distributor system, for a printer telegraph circuit in which energy of a plurality of coded signals applied thereto during any one character-interval may be simultaneously delivered to a printing circuit.

Another object of this invention is to provide a method and means cooperating with an electro-mechanical distributor, for detecting errors in received signal pulses delivered to the printer equipment of a printer telegraph system.

A further object is to provide an error detecting system, for printer telegraph systems employing a plural-element code, wherein an improper number of received code signals in a combination occurring during any one character-interval will produce an error indication.

A still further object is to provide, for a printer telegraph system, a distributor arrangement for simultaneously delivering to a printer circuit the coded signals applied during one character-interval to the distributor, and, cooperating with the distributor, means for detecting and indicating errors in the number of coded signals received during the character-intervals.

These and further objects and features of this invention should be clearly apparent and understood from the following description and discussion of a preferred embodiment, particular reference being had to the accompanying drawing, wherein the figure is a schematic diagram of a printer telegraph receiving distributor, error and detector and indicator, and part of the printing circuit, associated with the printer telegraph system in accordance with the principles of the present invention.

As indicated heretofore, each character which may be transmitted by the printer telegraph is represented by a combination of two signals impressed in a certain pair of nine available channels. At those positions where printing of the transmitted characters is to occur, it is required that the signal voltages actuate a printing mechanism at a definite time during any one character-interval in order that the correct character on the periphery of a rotatable printer wheel may contact and leave a visual indication on a tape. Each character-interval corresponds to the time for a single revolution of the printer wheel driven by a synchronous motor which is in synchronism with the motor which rotates the electro-mechanical distributor at the transmitting position.

An electro-mechanical distributor associated with the printer and also driven by the synchronous motor, makes possible the simultaneous delivery of the signal voltages from the nine channels to the printing mechanism at times appropriate for the printing of that character which is represented by signals from a combination of two particular channels. This is accomplished by virtue of the fact that commutator segments of the distributor are connected to the nine channels to produce an arrangement whereby a pair of brushes, having a fixed separation and rotatable by a motor, may wipe the segments and, at some time during any one revolution, conduct the charges on a pair of segments simultaneously to the printer actuating circuit. Wiring of the channels to the segments is such that, for any character represented by two signals in separate channels, the brushes will simultaneously contact these channels through the distributor segments at a time when the corresponding character on the printer wheel is opposite the tape and may be printed thereon by action of the printing mechanism excited at that particular moment by the pair of signals collected by the brushes.

Error detection and indication is provided by means of a circuit associated with the distributor and nine channels, its operation being such that an improper number of signal voltages incoming over these channels during any one character interval, will prevent printing of any character until the error symbol, the last character in any one rotation cycle of the printer or type wheel, is reached. More detailed information regarding the theory of operation of the form of printer telegraph system may be obtained by reference to the copending application of J. A. Herbst-G. R. Clark, Serial No. 691,282, filed August 17, 1946, and issued on September 26, 1950, as U. S. Patent No. 2,523,300.

The circuit of the figure illustrates nine channels 1–9, over which signals from a receiver or from the transmitter distributor directly, may be delivered individually to miniature thyratrons, 10–18 respectively. A receiver distributor system 19, comprising the commutator segments, 20, a pair of take-off brushes 21, a common bus 22, and a brush 23, connecting brushes 21 to the bus over lines 24. Each of the leads, 25–33, leading from the thyratrons 10–18 to the commutator segments is wired to a plurality of commutator segments. The wiring is so arranged that the brushes, 21, having a fixed spacing will contact every possible combination of two segments connected to different channels in one complete revolution past all the segments which are arranged circumferentially about some circular form. The brushes are driven by a motor, 34, which is also employed to rotate a printer or type wheel 34a, and the error cam, 35. The type wheel bears a synchronous relation with the distributor brushes which enables the correct character on the periphery of the wheel to be opposite a printing tape 35a and at the time the brushes are wiping a pair of commutator segments bearing a pair of signal voltages from a channel combination corresponding to this character.

As soon as switch 36 is closed to put the printer into operation, the relay coil, 37, may be energized by any current which is caused to flow from the high voltage point, 38, through the winding of marginal relay 39, winding of relay 37, switch 40, switch 36, one of the fired thyratrons, 10–18, to ground. Relay 37 closes switch 41 and energizes relay coil or starting magnet 42 by current flowing from high voltage point 43 to ground, closing starting switch 44. Linkage 45a is connected to the armature, 45, of the switch 44 and normally engages a start pin 34b on the type wheel 34a to arrest motion of this wheel at a home position but releasing it for rotation when the coil 42 is energized, as is well known in start-stop printers. The type wheel 34a receives ink from inking roller 35b, against which it presses.

When two segments having voltage thereon are simultaneously contacted by the brushes 21, the combined voltage is applied to the control grid, 46, of a screen-grid thyratron 47, causing this tube to ignite. A single voltage pulse from one segment alone is insufficient to ignite the thyratron. Ignition of thyratron 47 causes stop magnet 48, to become energized by current flowing from source 43 through the switch 44 and the thyratron 47 to ground. The stop magnet, 48, pulls down an arm 48a, not shown, which engages a stop wheel 48b, holding the type wheel 34a against the torque produced by a friction clutch 48c driven by motor 34. At the same time, printing magnet, 49, is similarly energized to cause a character on the type wheel to be printed through the operation of printing hammer 49a, which urges tape 35a against the selected type character on type wheel 34a. Operation of magnet 49, also opens switch 40 removing plate voltage from point 38 to the plates of thyratrons 10–18 and extinguishing these thyratrons so they are in condition to receive the potentials of the succeeding character.

Clearing out of thyratrons 10–18 by opening of switch 40 also deenergizes relay coil 37, opening switch 41, deenergizing start relay coil 42 and releasing armature 45 to return to a position where it will cause linkage 45a to reengage start pin 45a to arrest the motion of the type wheel in its home position, that is, the position from which motion of the wheel always starts when any one character is to be printed. The opening of switch 44 removes plate potential from thyratron 47 and extinguishes it; thus the original conditions prior to reception of signals have been restored.

If no signals are delivered by channels 1–9, no printer operation takes place because relay 37 cannot be energized, and switch 41, controlling the start relay 42 and switch 44, will not be closed. Should only a single signal be received, no printing will occur until the type wheel reaches the final character, the error symbol. Printing occurs at that time due to the closing of switch 50 by error cam 35 thereby causing the energization of printing magnet 49; since the switch 44 will have been closed before that time. Relay 37 is actuated by the receipt of a single signal and completes a circuit for start relay 42 over contact 41. Tube 47 will not operate however because of insufficient voltage. Positive potential from point 43 is applied to the grid 46 of the thyratron 47 by error cam 35 over switch 44 and windings of magnets 48 and 49 to cause firing thereof and a consequent printing of the error symbol.

When three or more of thyratrons 10–18 have been ignited by signals delivered over channels 1–9, the current which will flow through these and through relay coils 37 and 39 will be of sufficient magnitude to cause switch 51 to be opened by marginal relay 39. Since switch 51 thereby opens the circuit from the distributor bus 22 to grid 46 of thyratron 47, no printing can take place until the error symbol is in a position to be printed, at which time the above described series of events takes place beginning with closing of switch 50 by error cam 35.

Other features of this telegraph system may be observed in the disclosure of the previously-mentioned copending application, from which it should be apparent that the printing distributor and error indicating arrangement herein described may be employed with the transmitting apparatus for producing a copy of the messages being transmitted or with the receiving equipment for printing the received characters. Although the present invention has been discussed with particular reference to a single preferred embodiment, it should be realized that many changes may be made by those skilled in the art without departing in spirit or principle from what has been disclosed herein; therefore the scope of this invention should not be considered limited by the embodiment described.

I claim:

1. In a printer telegraph printing system, an electromechanical distributor device including distributor driving means comprising printing means, commutator means having a plurality of commutator segments, means for connecting each of a plurality of signal channels to several separate spaced segments of said commutator, said connections being such that each combination of two of said channels will provide connections to a pair of equally spaced segments, means for simultaneously conductively contacting a pair of said segments at the said equal spacing, said means being movable to contact different pairs of said commutator segments, conductive means being associated with said last-named means to conduct electrical energy therefrom, means cooperating with said distributor responsive to signal energy in only two of said channels for causing the printing of a character represented by said two channels and means responsive to signal energy in only one or more than two of said channels for causing the printing of an error symbol.

2. A printer telegraph system as claimed in claim 1, wherein said means for causing the printing of an error symbol comprises a source of potential, an electron discharge tube having a plurality of electrodes including a control electrode, said conductive means adapted to be normally connected to the control electrode of said tube, relay means serially disposed between said source and the discharge path of said tube, a pair of relays adapted to be serially connected between said source and said signal channels, said relays under control of said relay means, each of said relays having associated movable contacts and each adapted to be operated when fed with a current of a pre-determined amplitude, a third relay serially connected between said source and the contacts of a first of the relays of said pair, said printing means under control of said relay means, switch means serially connected between the control electrode and another of the electrodes of said tube, said switch means under cyclic control of said distributor driving means, means to break the connection of said conductive means to the control electrode of said discharge tube under control of the contacts of the second of said pair of relays, said first relay adapted to be actuated when fed with a current from at least one of said signal channels, and said second relay adapted to be actuated when fed with a current from more than two of said signal channels.

JOHN A. HERBST.

REFERENCES CITED

The following references are of record in the file of this patent:

UNITED STATES PATENTS

| Number | Name | Date |
|---|---|---|
| 2,153,737 | Spencer | Apr. 11, 1939 |
| 2,366,434 | Brown | Jan. 2, 1945 |
| 2,406,835 | Herbst | Sept. 3, 1946 |